March 9, 1937. B. E. A. VIGERS 2,073,327
HIGH VACUUM DISTILLATION AND APPARATUS THEREFOR
Filed June 15, 1936
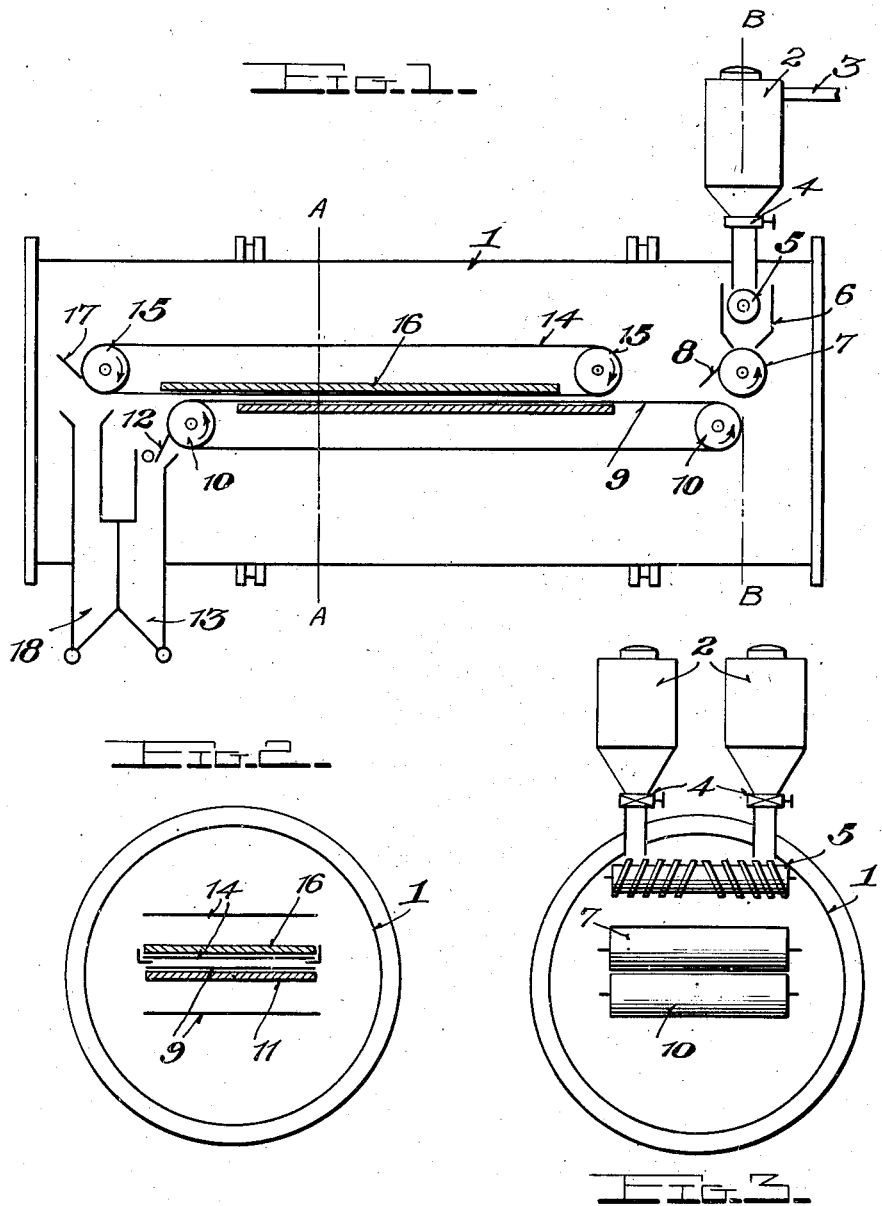
Inventor
BRIAN E. A. VIGERS,
By K. P. McElroy
Attorney Patented Mar. 9, 1937

2,073,327

UNITED STATES PATENT OFFICE 2,073,327

HIGH VACUUM DISTILLATION AND APPARATUS THEREFOR

Brian Edmund Allen Vigers, Dunstable, England, assignor to Imperial Chemical Industries, Limited, a corporation of Great Britain Application June 15, 1936, Serial No. 85,411
In Great Britain June 14, 1935

6 Claims. (Cl. 202—52)

(Granted under the provisions of sec. 14, act of March 2, 1927; 357 O. G. 5)

This invention relates to an improved method and apparatus for short-path high-vacuum distillation, in particular of solid materials or of substances giving rise to non-flowing distillates or residues.

In short-path high-vacuum distillation an extremely high vacuum of the order of $10^{-2}$ to $10^{-6}$ mms. of mercury is maintained within the still and the evaporating and condensing surfaces are in close proximity, usually about 1-5 cms. apart. The usual forms of apparatus for effecting such distillation are not very suitable for treating substances of the kind referred to. Thus, when a solid substance is to be distilled, it is necessary to arrange that it is spread over the evaporating surface in the form of a very thin layer.

In British specification 437,895 a method for the short-path high-vacuum distillation of solids has been described, in which the solid is suspended or dissolved in a suitable liquid medium and the suspension or solution is then submitted to distillation. Also in British specification 435,032 a method for the short-path high-vacuum distillation of substances giving rise to non-flowing condensates or residues or both has been described, in which the condensing or evaporating surfaces or both are moved relatively to scraping devices, preferably by moving the scraping device to and fro in a continuous manner. Unless, however, the initial material can be fed to the evaporating surface in liquid form, i. e. in molten form, or in solution or suspension in a liquid medium, it is difficult to carry out the distillation in a continuous manner, and it is difficult to arrange for the desired uniform thin layer of initial material to be obtained.

The principal object of the present invention is to provide a method and apparatus suitable for the short-path high-vacuum distillation of a solid material as such, or of liquids which yield solid condensates or residues or both, if desired in a continuous manner. It will be understood, however, that the method and apparatus of the invention are also applicable to what may be regarded as the more normal case of the short-path high-vacuum distillation of liquids resulting in liquid condensates.

According to the method of this invention, short-path high-vacuum distillation, especially of solid materials or substances giving rise to non-flowing distillates or residues, is effected by feeding the initial material in the form of a thin layer on to a moving surface adapted to be heated to the requisite temperature, the condensate being collected on a parallel moving surface in close proximity, e. g. about 1-5 cms. distant from the evaporating surface, and adapted to be cooled, and the residue and condensate being separately collected from the said moving surfaces. The moving surfaces are preferably substantially horizontal and the lower surface is preferably the evaporating surface. The bands, or the effective portions thereof, are not, however, necessarily horizontal. They may, for instance, be vertical or sloping at any desired angle.

Suitable apparatus for carrying out the invention comprises parallel moving surfaces spaced a short distance apart, e. g. about 1-5 cms., means for heating one of said surfaces and means for cooling the other surface, means for feeding the initial material on to the heated moving surface in the form of a thin layer and separate means for collecting residue and condensate respectively from the said moving surfaces. The moving surfaces may take the form of endless bands of thin flexible metal, passing in close proximity to stationary heating and cooling elements arranged at the back of the evaporating and condensing surfaces respectively. In one form of apparatus the moving surfaces are mounted axially in a cylindrical vessel having one or more feeding hoppers on one end, and separate discharge hoppers for residue and condensate at the other end. If desired the feeding hopper or hoppers may be adapted to be evacuated separately from the main vessel.

One form of the invention will now be described with reference to the accompanying drawing in which Figure 1 is a diagrammatic vertical section through a short-path still constructed in accordance with the invention, and Figures 2 and 3 are diagrammatic cross-sections along the lines A—A and B—B of Figure 1 respectively.

A cylindrical vessel 1 forms the outer shell of the still. This vessel is adapted to be evacuated, by suitable pumping means (not shown), to the required high vacuum. The hoppers 2 containing the solid material to be distilled are also evacuated through the conduit 3, although not necessarily to the same high degree of vacuum as the still itself. Duplicate hoppers are provided to enable continuous feeding of material to be obtained, one hopper being refilled and re-evacuated while the other is discharging its contents of solid material. The valves 4 are adapted to give a vacuum-tight seal when closed, so that the hoppers may be filled at normal pressure. The material is fed from the hoppers 2 via regulating valves 4 on to a feeding device 5 and thence to a trough 6 and a rotating distributor 7.

By means of a knife edge 8 which bears against the distributor 7, the material is fed as a thin layer on to the continuous band 9, constructed of thin flexible metal, which passes in the direction of the arrow over rollers 10 and also over and in close proximity to a heating element 11. The residue from the distillation falls off, or is scraped off by a knife 12, from the band 9 into a hopper 13.

A similar continuous band 14 is spaced 1–5 cms. above the band 9 and moves in the same direction, passing over rollers 15 and under and in close proximity to a cooling element 16. Condensate collects on and adheres to the lower surface of this upper band and is scraped off by a knife 17 into a hopper 18. The hoppers 18 and 13 may have vacuum-tight auxiliary compartments to enable them to be emptied without intereferring with the continuity of the process.

The heating and cooling elements may suitably comprise a body of cast metal of good heat conductivity, e. g. aluminum, in which are embedded seamless metal tubes such as steel or copper tubes. In practice, it is preferable to run the band 14 at a higher speed than the band 9, to ensure efficiency of condensation and also to prevent the likelihood of more condensate forming at a given place on the band than is likely to adhere to it.

Various modifications of the apparatus hereinbefore described may be made in carrying out the invention, and all such modifications are intended to come within the scope of the appended claims insofar as they achieve to a useful degree the improvements and advantages hereinbefore disclosed.

I claim:—

1. A method for short-path high-vacuum distillation, which comprises feeding the material to be distilled in the form of a thin layer on to a moving surface adapted to be heated to the requisite temperature, collecting condensate on a parallel moving surface which is in close proximity to the evaporating surface, and adapted to be cooled, and separately collecting residue and condensate from the said moving surfaces.

2. A method as set forth in claim 1, in which the moving surfaces are substantially horizontal.

3. A method as set forth in claim 1, in which the moving surfaces are substantially horizontal and the lower surface forms the evaporating surface.

4. An apparatus for short-path high-vacuum distillation, comprising means providing parallel moving surfaces spaced a short distance apart, means for heating one of said surfaces and means for cooling the other surface, means for feeding the initial material on to the heated moving surface in the form of a thin layer, and separate means for collecting residue and condensate respectively from the said moving surfaces.

5. Apparatus for short-path vacuum distillation, comprising two endless bands of thin flexible metal spaced apart a short and substantially equal distance to provide opposed surfaces, means for moving each of said bands, a stationary heating element arranged behind one band in close proximity thereto, a stationary cooling element arranged behind the other band in close proximity thereto, means for feeding raw material to the first of said bands in the form of a thin layer, and means for separately collecting residue and condensate respectively from the two bands.

6. Apparatus for short-path high-vacuum distillation, comprising a cylindrical vessel enclosing a chamber, means providing two closely spaced substantially parallel surfaces adapted for moving in the direction of the axis of the cylinder, means for heating one of said surfaces, means for cooling the other of said surfaces, at least one feeding hopper at one end of the chamber and adapted to supply raw material to one of said surfaces, and separate discharge hoppers at the other end of the chamber arranged to receive residue and condensate from the two surfaces.

BRIAN E. A. VIGERS.